UNITED STATES PATENT OFFICE.

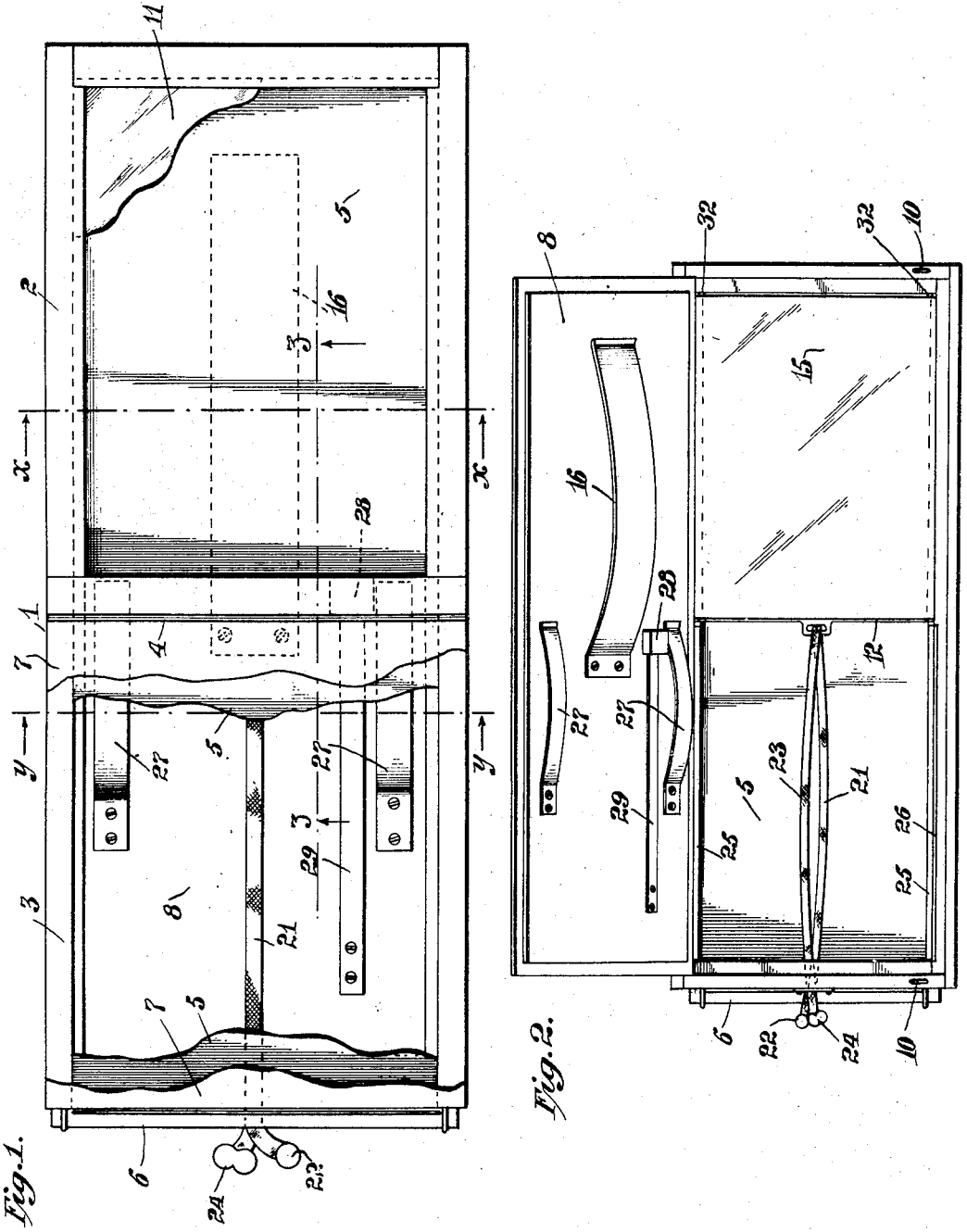

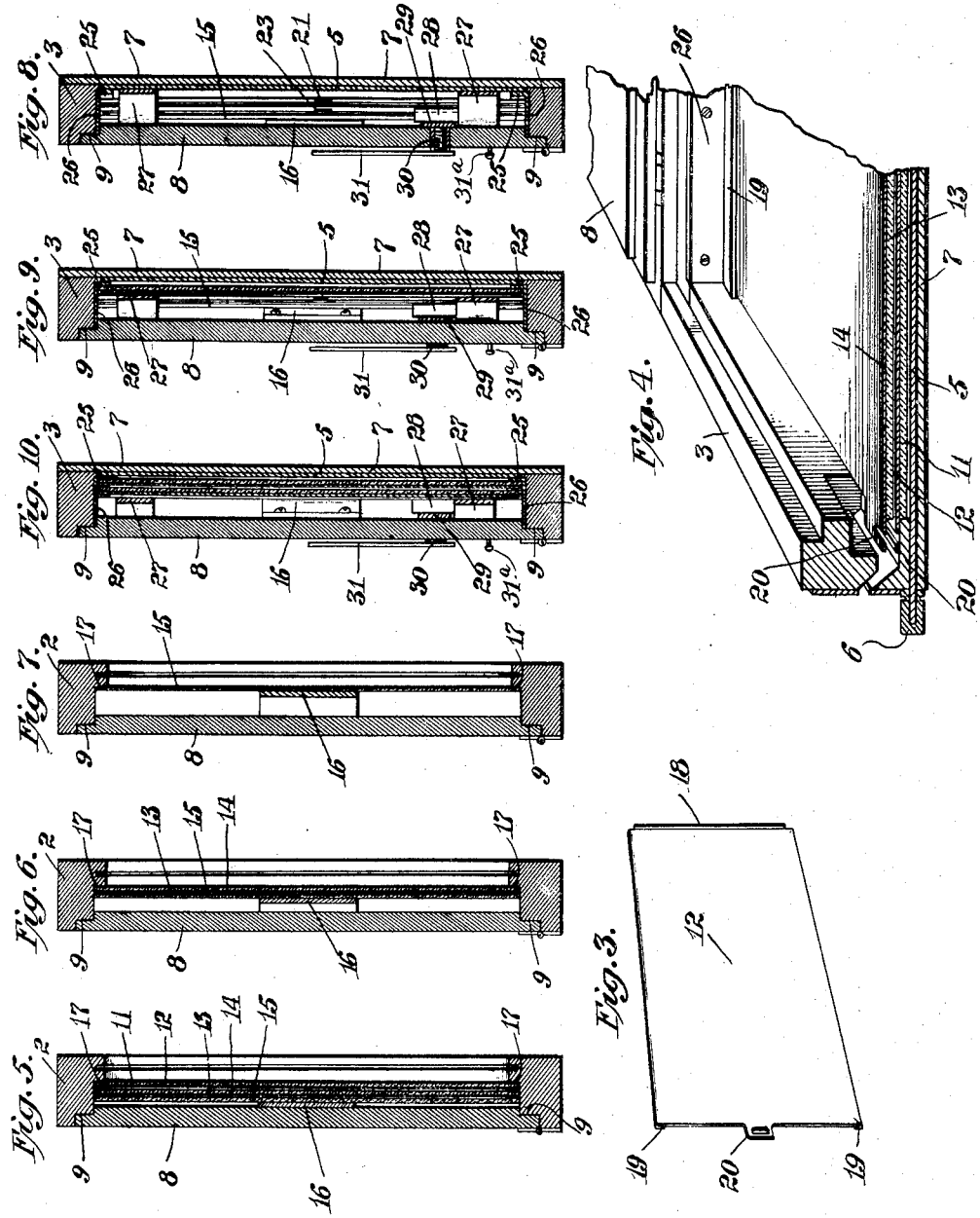

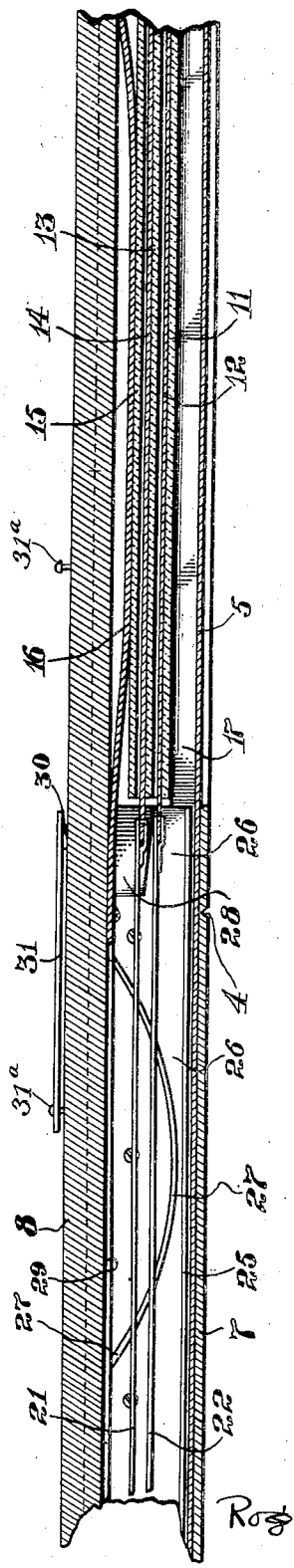

FREDERIC E. IVES, OF WOODCLIFFE-ON-HUDSON, NEW JERSEY.

PHOTOGRAPHIC-PLATE HOLDER.

1,098,445. Specification of Letters Patent. Patented June 2, 1914.

Application filed July 23, 1912. Serial No. 711,040.

*To all whom it may concern:*

Be it known that I, FREDERIC E. IVES, a citizen of the United States, residing at Woodcliffe-on-Hudson, in the county of Bergen and State of New Jersey, have invented certain new and useful Improvements in Photographic-Plate Holders, of which the following is a specification, reference being had therein to the accompanying drawing.

My invention relates to photographic plate holders, and more particularly to a plate holder designed to carry a plurality of plates for successive exposure.

Among the objects of the present invention are to generally improve the construction and operation of plate holders designed to carry a plurality of plates, and to afford greater ease of manipulation in order to bring the successive plates into proper exposing position.

Another and special object hereof is to afford a plate holder well adapted for employment in the art of color photography, and such as will enable an ordinary camera to be employed for color photography. Of the known systems of color photography, I prefer that involving the production by means of a camera of three-color selection negatives, although to some extent the principles herein described would be applicable to another plural number of negatives, for example two or four.

I shall hereinbelow describe as one form of embodiment of my present invention, a photographic plate holder adapted for color photography purposes, in which is secured the ability to present in rapid succession for exposure the three or other number of sensitive plates with ease of manipulation, with positive assurance that each plate will during exposure stand in the same focus and the same position as the preceding plates, and which will avoid any tendency to movement for disturbance of the apparatus.

According to the invention hereof, a plate holder is provided which comprises a frame having first an exposure portion to fit into the camera or apparatus, and second an extension of substantially as great length again as the exposure portion, combined with a slide piece shiftable for the purpose of exposing the foremost plate, and one or more opaque plate separators, backers or carriers, each adapted to be shifted by external means from the exposure portion of the plate holder into the extension, and means such as a spring to press forward the plates and separators in said exposure portion against a fixed ledge. A further important feature that will be described more in detail, relates to the above plate holder when for the purpose of carrying three plates, and involves a construction in which the forward side of the extension is deeper than the exposure portion as determined by the bottom or ledges thereof, a spring serving to press the first withdrawn plate and separator into the deeper portion or recess so as to make way for the shifting of the second plate and separator, the third plate not having to be shifted.

I will first describe one embodiment of my present invention and will thereafter point out the novel features in the claims.

In the accompanying drawings forming a part hereof, Figure 1 is a front elevation of a plate holder embodying my invention, the exposure slide being in closed position, the front board being shown broken away and the slide broken away at two places to disclose the interior. Fig. 2 is a plan view of the back of the plate holder of Fig. 1 laid down in position for filling in a dark room and with the slide in and with the hinged back opened up. Fig. 3 shows in perspective one of the two plate separators, backers or carriers. Fig. 4 shows in perspective and partly in central cross-section the further left-hand corner of the interior. Figs. 5, 6 and 7 are transverse cross-sections taken on the plane $x$—$x$ of Fig. 1, showing the parts in three different stages of position. Figs. 8, 9 and 10 are similar cross-sections taken on the plane $y$—$y$ of Fig. 1. Fig. 11 is a longitudinal cross-section taken on the plane $z$—$z$ of Fig. 1.

Similar characters of reference designate corresponding parts in the several figures of the drawings.

Understanding that the preferred embodiment of my invention illustrated herein is a plate holder for carrying not an indefinite number of plates but a small plural number, two, three or four, preferably three, the details thereof will now be described.

The general frame 1 of my novel plate holder comprises the exposure portion 2 adapted to enter the camera, and the extension portion 3 which preferably projects from the camera during use. There may be a transverse groove at 4 between the portions 2 and 3 for the purpose of engaging a corresponding rib or tongue of the camera to better exclude light. The exposure portion 2 of the plate holder is open in front except as closed by the slide 5, which may be pulled out by the enlargement or handle 6 at the left end, while the extension of the plate holder is closed by a front board 7. In addition to the fixed frame parts and the movable devices described, this plate holder has a hinged back 8, hinged at its lower rear side to the rear of the frame. When closed as seen is Fig. 5, the back 8 snugly fits against shoulders 9 of the frame to better exclude light, and catches 10 of any suitable kind are employed to hold the hinged back in closed position when the plate holder is loaded.

The plate holder is to be loaded in a dark room and the manner of loading will be hereinafter described, the unexposed plates all standing edgewise in the exposure portion of the plate holder. Thus the first sensitive plate 11 is at the front. Directly back of this is the first separator, backer or carrier 12, as seen in Fig. 5. Then follows the second sensitive plate 13, the second backer 14 and the third sensitive plate 15 which needs no backer, although to the rear of it is a curved plate spring 16 constantly pressing forwardly against all of the plates and backers in the exposure end of the plate holder so as to cause the foremost of the plates to stand in close contact with the ledges or shoulders 17 near the front of the frame, which accurately insures each of the plates standing in proper focusing plane.

The sensitive plates 11, 13 and 15 are preferably of the ordinary rectangular form, but if desired the character of sensitizations may differ according to the color selection which each of them is to record. In this connection it will be understood that the camera at the lens or elsewhere may be provided with a suitable color screen or screens, for example of the interchangeable or revolving types.

The brackets, separators or carriers 12 and 14 will preferably be as seen in Fig. 3, which is a front view in perspective. Each of them at its inner end has a slight forwardly extending flange 18 that should be less than the thickness of the sensitive plate, but of sufficient height to insure the plate drawing out with the backer when shifted into the extension. In addition to the flange 18, each of the backers is preferably provided with a longitudinal rib or the like along the back of the upper and lower edges formed for instance by an integral strip of edge metal being bent backwardly upon itself as shown at 19. This avoids scratching by each backer of the sensitive plate behind it. Each backer is also provided with an attaching means 20 for a drawing string or pull cord. In the case of backer 12 the string 21 is shown passing through the extension and through a crooked hole in the outer extension wall to where a button 22 is provided, whereby the string may be pulled for shifting the backer 12 and plate 11 into the extension. Similarly the backer 14 is provided with a string 23 having a button 24 distinguished in some convenient way from button 22. For example, button 22 may be single while button 24 is double to indicate that the former is to be pulled first, the other to be subsequently pulled for drawing the second plate and backer into the extension so as to expose the third plate.

As before stated I prefer the three-color system, and when three plates are to be exposed (or in some cases four plates) the following novel expedient is applicable: In depth the interior of my plate holder extends farther forwardly in the extension than in the exposure portion. This is well indicated by the position of the ledges 17 in Figs. 5, 6, 7, as compared with the ledges 25 shown in Figs. 8, 9 and 10. The latter are the farther forward rendering the plate holder deeper at that point, and they may be conveniently produced in the form of flanges on metallic lining plates 26.

In order to press forwardly the first sensitive plate 11 and its backer 12, when they have been shifted into the extension, a pair of curved plate springs 27, 27 are mounted on the hinged back as shown. When shifting one of the sensitive plates with its backer, it is important that the succeeding plates should not be accidentally shifted, and to prevent this I have mounted a block or stop 28 upon the hinged back in proper position and of such size as to stand in the way of the movement of any but the foremost plate and backer. If desired this block may be made adjustable by mounting it upon a supporting spring 29 which may be adjusted from or toward the hinged back by means of a screw device 30 having an external handle 31. If the plates used were always of one definite thickness, the adjustment referred to would be unnecessary. If, however, very thin plates are sometimes used, and at other times very thick ones, as may be the case, it is important to be able to sufficiently elevate the stop or block to prevent the simultaneous shifting of two plates when the latter are thin, and to move the block in a reverse direction when the plates are thick, to be sure that a single plate may pass. Preferably I would turn the handle so as to adjust the block to elevated position such as would be appropriate for the thinnest of plates, and then if the foremost plate refused to move, slightly lower the block until the plate is able to be moved. The necessity of this adjustment might be diminished by providing an elastically yielding edge to the block.

Two stops 31ª are shown for limiting the movement of the handle 31.

I will now describe the operation of this invention.

To load the plate holder in a dark room, it is placed face down and opened as in Fig. 2. The first plate to be exposed will then be laid face down in the exposure portion as far to the right as it may be placed. A pair of thin stops or projections 32, 32 preclude the plate from actually touching the end wall, leaving a thin transverse recess between plate and wall. A backer or separator will then be laid upon this with the flange 18 pointing downwardly between the plate and the end of the plate holder. This backer presents at its side edges the two ribs 19. Upon these ribs is placed the second sensitive plate, and to the pile is then added the second backer in similar position to the previous one. Finally the third sensitive plate is laid upon the second backer face down, and the drawing strings being in proper position the hinged back of the plate holder is closed. The plate holder then contains the proper material for the three exposures necessary for a "color photograph." The plate holder will be slid into the camera and properly engaged to exclude light. The slide 5 will then be pulled out sufficiently far to entirely uncover the foremost plate. The slide might be pulled in any direction, but for convenience it is pulled through the extension.

Assuming that the camera has been properly focused, a color screen, if one is to be used, will then be fitted on the lens and an exposure made upon the first plate. The instant the lens is closed the first drawing string will be pulled, thus sliding the exposed plate into the extension and permitting the second plate to snap forward into exposing position. Upon a change of color screens a second exposure is then made, and the second plate is then shifted into the plate holder extension, upon which the color screen is a second time changed and the final exposure made. This by my invention is enabled to be done with such facility and quickness as to attain all the advantages hereinbefore recited, and also to preclude as far as possible any change in the light or other conditions which would interfere with the proper balance of the three negatives to be produced. The slide is then pushed backwardly into shut position and the plate holder removed from the camera to be replaced by another one for any succeeding picture to be taken. In due time the photographer will take the plate holder to a dark room and remove the exposed plates from the back thereof, giving them such treatment as they require.

While the plate holder has been described as passing into the camera laterally so that the plates shift horizontally from the exposure portion to the extension, the arrangement might be changed and the plate holder set into the camera from above. Upon pulling up the first plate and backer, they will be pressed forwardly into the deeper recess of the extension and are held against possible falling. Upon raising the second plate and backer, the third plate is sprung forwardly beneath them and they are thereby locked against accidental falling.

Having described my preferred embodiment of this invention, it should be stated that since the details of construction and operation may be variously modified while retaining the principles of the improvement, I do not limit myself to details except as set forth in the appended claims.

What I claim and desire to secure by Letters Patent is:

1. A photographic plate holder comprising in combination an exposure portion adapted to hold a plurality of photographic plates, an extension, an opaque plate separator adapted to shift in a substantially straight line from the exposure portion into the extension and to carry the foremost plate with it, and external means for shifting said separator.

2. A photographic plate holder comprising in combination an exposure portion adapted to hold a plurality of photographic plates, an extension, an opaque plate separator adapted to shift from the exposure portion into the extension and to carry the foremost plate with it, and external means for shifting said separator; said exposure portion constructed to have a transverse recess between its end wall and each plate, and said separator having a forward projection engaging between plate and wall.

3. A photographic plate holder comprising in combination an exposure portion adapted to hold a plurality of photographic plates, an extension, an opaque plate separator adapted to shift from the exposure portion into the extension and to carry the foremost plate with it, and external means for shifting said separator; said exposure portion constructed to have a transverse recess between its end wall and each plate, and said separator having a forward projection engaging between plate and wall, and raised rear marginal portions to prevent contact between its rear and the plate behind.

4. A photographic plate holder comprising in combination an exposure portion adapted to hold a plurality of photographic plates, an extension having a crooked passage in its wall, an opaque plate separator adapted to shift from the exposure portion into the extension and to carry the foremost plate with it, and external means for shifting said separator comprising a drawing string passing through a crooked passage in the extension wall.

5. A photographic plate holder comprising in combination an exposure portion, an extension, a plate carrier adapted to shift from the exposure portion into the extension and to carry the foremost plate with it, means for shifting said carrier, and means for pressing in the same forward direction the plates in the exposure portion and in the extension.

6. A photographic plate holder comprising in combination an exposure portion, an extension, a plate carrier adapted to shift from the exposure portion into the extension and to carry the foremost plate with it, means for shifting said carrier, and a stop or block located to prevent any but the foremost plate and carrier passing into the extension and means for adjusting said stop for plates and carriers of varying thickness.

7. A photographic plate holder comprising in combination an exposure portion, an extension, a plate carrier adapted to shift from the exposure portion into the extension and to carry the foremost plate with it, means for shifting said carrier, an openable back to said plate holder, and a stop or block located to prevent any but the foremost plate and carrier passing into the extension, said stop or block mounted on the openable back of the plate holder.

8. A photographic plate holder comprising in combination an exposure portion, an extension, a plate carrier adapted to shift from the exposure portion into the extension and to carry the foremost plate with it, means for shifting said carrier, and an exposure slide extending through said extension and exposure portion and withdrawable through said extension.

9. A photographic plate holder comprising in combination an exposure portion adapted to hold at least three photographic plates, an extension in alinement with said exposure portion, a plurality of rigid plate separators or carriers each adapted to shift from the exposure portion into the extension and to carry with it the plate in front of it, and exterior means operable after exposure of the respective plates carried on said carriers for successively shifting said respective carriers.

10. A photographic plate holder comprising in combination an exposure portion adapted to hold at least three photographic plates, an extension, a plurality of plate separators or carriers each adapted to shift from the exposure portion into the extension and to carry with it the plate in front of it, and means for successively shifting said separators or carriers, comprising a plurality of drawing strings accessible from the exterior and mutually distinguishable.

11. A photographic plate holder comprising in combination an exposure portion adapted to hold at least three photographic plates, an extension, a plurality of plate separators or carriers each adapted to shift from the exposure portion into the extension and to carry with it the plate in front of it, and means for successively shifting said separators or carriers, said extension being deeper in a forward direction than said exposure portion.

12. A photographic plate holder comprising in combination an exposure portion adapted to hold at least three photographic plates, an extension, a plurality of plate separators or carriers each adapted to shift from the exposure portion into the extension and to carry with it the plate in front of it, and means for successively shifting said separators or carriers, said extension being deeper in a forward direction than said exposure portion, to form a recess capable of receiving a shifted plate and carrier.

13. A photographic plate holder comprising in combination an exposure portion adapted to hold at least three photographic plates, an extension, a plurality of plate separators or carriers each adapted to shift from the exposure portion into the extension and to carry with it the plate in front of it, and means for successively shifting said separators or carriers, said extension being deeper in a forward direction than said exposure portion, and provided with pressing means for moving forward the first shifted plate and carrier.

14. A photographic plate holder comprising in combination an exposure portion adapted to hold three photographic plates and two separators or carriers, an extension, two plate separators or carriers each adapted to shift from the exposure portion into the extension and to carry with it the plate in front of it, external means for successively shifting said separators or carriers, and a pressing means for pressing forward a plate and carrier shifted into said extension, said extension formed with a forward recess to receive the first plate and carrier, whereby to make way for the second plate and carrier.

15. A photographic plate holder comprising in combination an exposure portion adapted to hold three photographic plates and two separators or carriers, an extension, two plate separators or carriers each adapted to shift from the exposure portion into the extension and to carry with it the plate in front of it, external means for successively shifting said separators or carriers, and a pressing means for pressing forward a plate and carrier shifted into said extension, said extension formed with a forward recess to receive the first plate and carrier, whereby to make way for the second plate and carrier, and a hinged openable back carrying said pressing means, and carrying a pressing means to press forward the plates in said exposure portion, and carrying an adjustable stop to preclude more than one plate and carrier to be shifted at one time into said extension.

16. A photographic plate holder comprising in combination an exposure portion adapted to hold a plurality of photographic plates, an extension, an opaque plate separator adapted to shift from the exposure portion into the extension and to carry the foremost plate with it, and external means for shifting said separator, said separator consisting of a plate with a flanged end to engage a photographic plate.

17. A photographic plate holder comprising in combination an exposure portion adapted to hold at least three photographic plates, an extension, a plurality of plate separators or carriers each adapted to shift from the exposure portion into the extension and to carry with it the plate in front of it, and means for successively shifting said separators or carriers, said extension being deeper in a forward direction than said exposure portion, said separator consisting of a plate with a flanged end to engage a photographic plate.

In testimony whereof I affix my signature in presence of two witnesses.

FREDERIC E. IVES.

Witnesses:
DONALD CAMPBELL,
ABRAHAM FELT.

---

Corrections in Letters Patent No. 1,098,445.

It is hereby certified that in Letters Patent No. 1,098,445, granted June 2, 1914, upon the application of Frederic E. Ives, of Woodcliffe-on-Hudson, New Jersey, for an improvement in "Photographic-Plate Holders," errors appear in the printed specification requiring correction as follows: Page 1, line 44, for the word "for" read *or;* page 2, line 12, for the word "is" read *in;* same page, line 46, for the word "brackets" read *backers;* and that the said Letters Patent should be read with these corrections therein that the same may conform to the record of the case in the Patent Office.

Signed and sealed this 23rd day of June, A. D., 1914.

[SEAL.]

R. F. WHITEHEAD,
*Acting Commissioner of Patents.*